United States Patent [19]

Moran et al.

[11] Patent Number: 4,555,411
[45] Date of Patent: Nov. 26, 1985

[54] PROCESS FOR PRODUCING A REDUCED FAT SPREAD

[75] Inventors: David P. J. Moran, Covington; John J. Hepburn, Milton Ernest; David G. Sharp, Clapham, all of England

[73] Assignee: Lever Brothers Company, New York, N.Y.

[21] Appl. No.: 511,407

[22] Filed: Jul. 7, 1983

[30] Foreign Application Priority Data

Jul. 8, 1982 [GB] United Kingdom ............ 8219845
Oct. 18, 1982 [NL] Netherlands .................. 8204009

[51] Int. Cl.$^4$ .................................. A23D 3/02
[52] U.S. Cl. ............................. 426/603; 426/613; 426/811
[58] Field of Search ............ 426/602, 603, 604, 811, 426/613

[56] References Cited

U.S. PATENT DOCUMENTS

| | | | |
|---|---|---|---|
| 2,997,396 | 8/1961 | North et al. | 426/603 |
| 3,266,904 | 8/1966 | Duin et al. | 426/604 |
| 3,379,118 | 4/1968 | Perez | 426/811 X |
| 3,393,086 | 7/1968 | Keating | 426/811 X |
| 3,492,125 | 1/1970 | Ray | 426/811 X |
| 4,108,678 | 8/1978 | Szuhaj et al. | 426/811 X |
| 4,362,758 | 12/1982 | MacNeill et al. | 426/603 |
| 4,443,487 | 4/1984 | Darling | 426/603 |

FOREIGN PATENT DOCUMENTS

| | | |
|---|---|---|
| 40874 | 12/1981 | European Pat. Off. |
| 1042387 | 9/1966 | United Kingdom |
| 2035360 | 12/1982 | United Kingdom |

*Primary Examiner*—Robert Yoncoskie
*Attorney, Agent, or Firm*—Milton L. Honig; James J. Farrell

[57] ABSTRACT

There is disclosed a process for producing a water-in-oil emulsion spread from a starting oil-in-water dairy cream which is substantially free from added emulsifiers. By shearing and cooling the dairy cream in the absence of a cream/air interface using an apparatus means internally coated with a hydrophobic material, an inversion occurs to produce the final water-in-oil emulsion spread.

7 Claims, No Drawings

PROCESS FOR PRODUCING A REDUCED FAT SPREAD

The present invention relates to a process for producing a water-in-oil (w/o) emulsion-spread with a reduced fat content, by which term is meant a fat content of at most 60%.

Conventionally emulsions of the w/o-type are produced with fat at a level ranging from about 40 to about 86% by adding an aqueous phase to a molten fatty phase containing an emulsifier and cooling the resulting emulsion while working it in a system of e.g. surface-scraped heat-exchangers and crystallizers until a homogeneous emulsion is obtained which is stabilized by solid fat crystals.

The phase volume ratio (fat/aqueous phase) is a limiting factor in the preparation of fat continuous emulsions by conventional techniques.

As the volume of the aqueous phase increases to say 60% to 70% or more the emulsion acquires an increasing tendency to invert into an o/w-emulsion which in some instances is less desirable in view of bacteriological hazards, unless preservatives or water activity depressing agents are present which improve the shelf stability of the product.

A useful way of producing w/o-emulsions of a very low fat content, e.g. less than 35%, consists in gradually spraying or injecting an aqueous phase into a fatty phase until the desired level of fat is reached while applying conditions of high shear to increase the viscosity of the emulsion and obtain a very fine dispersion of the aqueous phase corresponding to an average droplet size of preferably less than 5 microns.

In order to achieve such a fine dispersion very sophisticated emulsifiers such as polyglycerol esters have to be used and/or high shear conditions are required. Conditions of sufficient shear may be achieved by pumping and recirculating the emulsion through a static mixer while controlling the degree of stress on the mixture in the static mixer.

The above procedure has disadvantages. First of all it is energy-consuming, further it is time-consuming and last but not least the required degree of dispersion of the aqueous phase is such that a good stability of the emulsion is achieved but the organoleptic properties are poor in view of an insufficient release of water-soluble components under the shear and temperature conditions prevailing in the mouth on consumption.

Another known method for producing a w/o emulsion consists in churning a reconstituted, artificial cream or a natural dairy cream in a rotating drum or in a so-called Fritz machine, wherein under shear conditions the interface between air and the cream plays an important role in destabilizing the emulsion and causing phase inversion. Creams, particularly those containing about 40% of fat, are very difficult to churn in the absence of said interface between the cream and the air i.e. in an apparatus which is not used in the dairy industry, but which is commonly used in the margarine industry, such as surface-scraped heat-exchangers, crystallizer units (Votator A- and C-units) and static mixers. To facilitate phase inversion in the latter apparatus an emulsifier system has to be added to the cream, which detracts from the naturalness of the product and may meet legal restrictions in some countries.

There is need of an efficient process allowing the production of stable spreads with a reduced fat level, down to a level of fat of 15%, having acceptable organoleptic properties and the production of reduced fat spreads by phase inversion from a cream, particularly a dairy cream, which is substantially free from added emulsifiers.

Applicants have found a process which alleviates the disadvantages of the known methods and to a great extent meets the above desiderata.

The process according to the invention comprises
(i) producing an oil- and water-containing emulsion from a fatty phase and an aqueous phase;
(ii) shearing and cooling said emulsion, using means internally coated with or produced from a hydrophobic material, to crystallize the fat and obtain a water-in-oil emulsion-spread.

The means coated with or produced from a hydrophobic material may for instance consist of a vessel in which the pre-emulsion is prepared, cooled and worked, such as a surface-scraped heat-exchanger or a crystallizer unit, e.g. a Votator A- or C-unit as described in Margarine by Andersen & Williams, Pergamon Press 1965; further a static mixer, a pump, etc.

The hydrophobic material may consist of a hydrophobic polymer such as polytetrafluorethylene, paraffin, perspex or a fat which is plastic at room temperature. The means or the apparatus is preferably flushed with a plastic fat, preferably containing a component selected from a monoglyceride, a diglyceride, a phospholipid or mixtures thereof, which absorb to the surface of the apparatus (mostly made of stainless steel).

The plastic fat ideally consists of butter oil.

The use of equipment coated with, or produced from, a hydrophobic material contributes to a great extent to forming and maintaining a fat-continuous emulsion, whereby it is no longer necessary to achieve an extremely fine dispersion of the aqueous phase, as a result of which a more efficient use of the equipment (reduced residence time) becomes possible and the procedure is facilitated.

It is interesting to note that metal surfaces usually applied tend to acquire a hydrophilic nature by absorption of e.g. proteins.

On using the process according to the invention, it turned out to be possible to produce spreads which are less prone to phase inversion from a w/o- to an o/w-emulsion, even when the dispersed phase consists of aqueous droplets having a diameter near the upper limit of the range from 2 to 20 microns.

Preferably emulsions are produced in which the dispersed phase predominantly consists of aqueous drops having a diameter ranging from 8 to 20 microns.

Especially within the range from 8 to 20 microns a better release of flavours, especially water-soluble flavours and proteins, is achieved on consumption.

Although emulsions with a level of aqueous phase ranging from 15–85 wt.% could be produced by the process according to the present invention, it is particularly useful to apply said process for producing ultra-low fat-continuous spreads (level of fat ranging from 15 to 35%) which are very prone to phase inversion when processed by using conventional means.

The process of the present invention is thus particularly relevant for producing spreads containing less than about 35% of fat and preferably for spreads containing 15–35% of fat. If the production of such w/o-emulsions is envisaged, step (i) of the process according to the invention is carried out by gradually injecting or spraying small amounts of the aqueous phase into a preferably liquid fatty phase, to obtain a w/o-emulsion.

The aqueous phase of such emulsions is preferably present in the form of dispersed drops having a diameter ranging preferably from 8 to 20 microns and may contain common ingredients such as salts, acids, hydrocolloids and proteins and the fat phase may contain colouring substances, oil-soluble flavours and optionally emulsifiers, particularly emulsifiers having an HLB lower than 10, such as a monoglyceride.

It is also possible to produce a spread having a reduced fat content, i.e. a fat content of 60% or less, starting from a reconstituted or natural cream, by phase inversion in the absence of a cream/air interface.

Preferably the starting material used is natural dairy cream. Dairy cream having a fat content of about 40% will easily invert on churning, even in the absence of special emulsifiers, in the case where processing is carried out in the absence of a cream/air interface in a conventional apparatus used in the margarine industry for cooling and texturising emulsions, such as the above-mentioned Votator units, provided a hydrophobic material as mentioned before is used.

According to an embodiment of the invention a reconstituted cream (o/w-emulsion) is first passed through a Votator A unit (1) (a surface-scraped, deep-cooled rotating vessel), previously coated internally with a fat which is plastic at room temperature and preferably contains phospholipids, mono- or di-glycerides, in which the emulsion is worked and cooled, and further through a crystallizer unit (2), also coated with fat preferably containing one or more of the above-mentioned additives or with a hydrophobic material, preferably poly-tetrafluorethylene. A final spread of the w/o-type leaves the crystallizer unit.

The emulsions produced according to the invention are useful as such or as a component for admixture with another edible emulsion.

The invention will now be illustrated in the following Examples.

EXAMPLE 1

A w/o-emulsion spread was prepared from the following ingredients:

|  | wt. % |
|---|---|
| Aqueous phase | |
| Water | 77.650 |
| Salt | 1.750 |
| Lactic acid to pH 4.5 | 0.100 |
| Fatty phase | |
| Fat blend | 20 |
| of the following dilatation values: | |
| at 10° C. 640    at 25° C. 130 | |
| at 15° C. 425    at 30° C. 48 | |
| at 20° C. 248    at 35° C. 25 | |
| Monoglyceride (Hymono Sf 44) | 0.550 |
| Vitamins and colour | 0.0425 |
| Flavours | 0.0075 |

The process was carried out as follows:

(1) The aqueous phase was sprayed on to the fatty phase contained in a PTFE-coated vessel at 38° C. The droplet sizes of the spray were approx. 150–220 μm.

(2) During the addition of the sprayed aqueous phase the emulsion was recirculated through an external loop attached to the vessel and fitted with a static mixer (both PTFE-coated). The maximum viscosity of 18000 cP at shear rate 13.0 sec.$^{-1}$ and of 2700 cP at shear rate 134 sec.$^{-1}$, measured at 38° C., was reached at the completion of the addition of the aqueous phase.

(3) The emulsion obtained was subsequently cooled to 13° C. in a heat-exchanger and further crystallized in a PTFE-coated, uncooled, stirred crystallizer unit and packed at 21° C. The average droplet size of the dispersed aqueous phase was 5μ in the spread, which on storage remains a stable fat-continuous spread.

EXAMPLE 2

A w/o emulsion spread was prepared from the following ingredients:

|  | wt. % |
|---|---|
| Fatty phase | |
| Soya bean oil | 11.0 |
| Hardened soya bean oil | 5.0 |
| Hardened palm oil/palm kernel oil | 3.5 |
| Distilled monoglyceride (IV 44) | 0.45 |
| Colour | 0.015 |
| Flavour | 0.0079 |
| Aqueous phase | |
| Salt | 0.25 |
| Potassium sorbate | 0.16 |
| Carrageenan gum | 0.80 |
| Locust bean gum | 0.60 |
| Potassium chloride | 0.20 |
| Sodium caseinate | 1.20 |
| Cultured dairy proteins | 25.00 |
| Sodium hydroxide | 1.83 |
| Water up to | 100.00 |

The emulsion was prepared as follows:

The aqueous phase was sprayed on to the fatty phase in a PTFE-coated vessel at 38° C. The droplet size of the sprayed phase was approximately 200 μm. During the addition of the sprayed aqueous phase the emulsion was recirculated through an external loop attached to the vessel and fitted with a static mixer (both PTFE-coated).

The viscosity was about 150 poise at a shear rate of 6.4 sec.$^{-1}$. The average droplet size was 15 microns.

The desired viscosity was obtained by controlling the amount of shear.

The emulsion obtained was subsequently cooled to 13° C. in a heat-exchanger and further crystallized in an uncooled stirred crystallizer unit, coated with PTFE, and packed at 21° C.

No phase inversion occurred during processing. On consumption the water-soluble flavours were readily released and the product was found to have good organoleptic properties.

EXAMPLE 3

Preparation of a low-calorie w/o-emulsion-spread, starting from a reconstituted cream containing whole butter in the absence of non-dairy emulsifiers

|  | % |
|---|---|
| Whole butter (English country life) | 50.00 |
| Liquid skim milk | 48.42 |
| K-sorbate | 0.08 |
| Gelatin | 1.50 | pH 5.5 by addition of lactic acid.

Initially an o/w emulsion was prepared as follows:

Skim milk was heated to 60° C. and K-sorbate added by stirring. Whole butter was melted and added to the skim milk using a Silverson emulsifier. Gelatin was then added to the resulting o/w emulsion and the pH adjusted to the desired value.

The emulsion was then pasteurised at 80° C., cooled to 60° C. and passed through a Votator A-unit which had been previously filled with fat (preferably butterfat). In this unit the emulsion was rapidly cooled and stirred. The emulsion emerged from the A-unit at a temperature of 12°-15° C. It was then passed into a crystallizer unit filled with fat (again butterfat preferably) at 18°-20° C. and very high shear was applied. This caused complete phase inversion to occur during a w/o emulsion with the following characteristics:

C-value at 5° C. = 2740 g/cm$^2$
C-value at 15° C. = 1060 g/cm$^2$
Electric conductivity at 15° C. was 0.00017 $\mu Scm^{-1}$.

We claim:

1. A process for producing a water-in-oil emulsion spread having a fat content of at most 60%, comprising
   (i) providing an oil-in-water emulsion from a fatty phase and an aqueous phase at a temperature at which the fatty phase is melted, said emulsion being a dairy cream which is substantially free from added emulsifiers;
   (ii) shearing and cooling said emulsion in the absence of a cream/air interface, using apparatus means internally coated with a hydrophobic material, to cause phase inversion and obtain a water-in-oil emulsion-spread having the same level of fat as the starting oil-in-water emulsion.

2. A process according to claim 1, wherein the apparatus is internally coated with polytetrafluorethylene.

3. A process according to claim 1, wherein the apparatus, prior to step (ii), is internally coated by flushing with a plastic fat containing a component selected from the group consisting of a mono-glyceride, a di-glyceride, a phospholipid or mixtures thereof.

4. A process according to claim 3, wherein the plastic fat comprises butter oil.

5. A process according to claim 1 wherein a water-in-oil emulsion spread is produced in which the diameter of the dispersed drops of aqueous phase ranges from 2 to 20 microns.

6. A process according to claim 1, wherein a water-in-oil emulsion with a fat content of 15–35 wt.% is produced.

7. A process according to claim 6, wherein the diameter of the dispersed drops of aqueous phase ranges from 8 to 20 microns.

* * * * *